United States Patent [19]

Mizuno et al.

[11] Patent Number: 5,294,237
[45] Date of Patent: Mar. 15, 1994

[54] PROCESS FOR PRODUCING FLAKES OF GLASS

[75] Inventors: Toshiaki Mizuno; Takashi Yamagishi; Koji Yokoi; Kazuhiro Doushita, all of Osaka, Japan

[73] Assignee: Nippon Sheet Glass Co., Ltd., Osaka, Japan

[21] Appl. No.: 971,546

[22] Filed: Nov. 5, 1992

Related U.S. Application Data

[62] Division of Ser. No. 741,496, Jul. 31, 1991, Pat. No. 5,201,929.

[30] Foreign Application Priority Data

Mar. 9, 1990 [JP] Japan .................. 2-58519
Jun. 4, 1990 [JP] Japan .................. 2-145959
Jun. 11, 1990 [JP] Japan .................. 2-152355
Jul. 2, 1990 [JP] Japan .................. 2-174937

[51] Int. Cl.⁵ ............................ C03B 19/12
[52] U.S. Cl. ......................... 65/21.1; 65/21.5; 65/901; 65/23
[58] Field of Search ........... 65/21.1, 901, 142, 21.5, 65/33, 23, 900

[56] References Cited

U.S. PATENT DOCUMENTS 3,795,524 3/1974 Sowman .................. 501/95
4,985,380 1/1991 Douden .................. 501/33

FOREIGN PATENT DOCUMENTS 0240952 10/1987 European Pat. Off. .
51-34219 3/1976 Japan .
62-176928 8/1987 Japan .
63-201024 8/1988 Japan .
64-18454 1/1989 Japan .
2-83224 3/1990 Japan .

Primary Examiner—W. Gary Jones
Assistant Examiner—John Hoffmann
Attorney, Agent, or Firm—Kanesaka & Takeuchi

[57] ABSTRACT

A process for producing flakes of glass. The process is started by applying a solution containing an organic metal compound to a substrate. The solution is dried and peeled from the substrate. The resultant film is sintered. There is also disclosed an apparatus for producing flakes of glass. The apparatus comprises means 2 for applying solution 1 containing an organic metal compound to a substrate 3 taking the form of a loop, means 4 for drying the film created by the solution containing the organic metal compound, and means 5 for collecting flakes obtained by peeling the dried film from the substrate. The substrate forms a circulatory continuous conveyance path which passes through the applying means, the drying means, and the collecting means in succession.

16 Claims, 1 Drawing Sheet

PROCESS FOR PRODUCING FLAKES OF GLASS

This is a division of application Ser. No. 741,496, filed Jul. 31, 1991, now U.S. Pat. No. 5,201,929.

DESCRIPTION

1. Technical Field

The present invention relates to a process for producing flakes of glass and, more particularly, to a process for producing flakes of glass easily and efficiently, using a solution containing an organic metal compound as the starting material.

2. Background Art

Presently, flakes of glass are used as plastic fillers, corrosion resistant linings, and paints. Such flakes of glass consist mostly of soda lime silicate glass and are about 4 microns in thickness. They are produced by enlarging molten glass like a balloon, quickly cooling it, and pulverizing it. As the industry progresses, thinner flakes of glass withstanding higher temperatures have been required. Any method of industrially producing flakes of glass satisfying these requirements have not yet been put into practical use.

Naturally occurring mica is known as industrially used flakes. This has some problems: (1) it is expensive; (2) it is colored due to impurities; and (3) it lacks durability. In spite of these problems, it has found various applications, since no substitute exists.

A technique for producing sheet glass from a solution containing an organic metal compound by the sol-gel process is described, for example, in Japanese Patent Laid-Open No. 34219/1976. In this known process, an organic metal compound is hydrolyzed and poly-condensed. The resultant solution is made to float on another liquid such as water, to prepare sheet glass. In this described process, thin pieces of glass having thicknesses less than 1 μm are obtained. It can be estimated that flakes of glass can be produced by pulverizing these pieces of glass. However, this technique has the following disadvantages: (1) it is difficult to recover the glass pieces floating on water; and (2) a uniform film thickness cannot be easily obtained. Hence, it is substantially difficult to industrially produce flakes of glass by this technique.

DISCLOSURE OF INVENTION

In view of the foregoing prior art technique, it is an object of the invention to provide a process and an apparatus for easily and efficiently producing thin flakes of glass which have been heretofore impossible to manufacture.

The novel process for producing flakes of glass uses a solution containing an organic metal compound as the starting material. This starting material is applied to a substrate, preferably a substrate whose surface is smooth. The starting material is then dried and peeled from the substrate. Subsequently, it is sintered.

In this process, the thickness of the solution containing the organic metal compound on the substrate can be controlled by adjusting the viscosity of the solution and the concentration of the organic metal compound in the solution. Thus, flakes of glass which have been heretofore impossible to manufacture can be easily made.

In order to facilitate peeling the applied and dried film from the substrate and to easily and efficiently produce flakes of glass showing stable physical properties, the solution containing the organic metal compound is caused to react with water. Then, the resultant solution is applied to the substrate. Similarly, it is desired to dry, peel off, and sinter the film on the substrate. Flakes of glass which can be readily peeled off the substrate can be obtained by this process.

An apparatus for producing flakes of glass in accordance with the invention comprises: means for applying a solution containing an organic metal compound to a substrate taking the form of a loop; means for drying the film created by the solution on the substrate; and means for collecting the flakes obtained by peeling the dried film from the substrate. The substrate taking the form of a loop forms a circulatory continuous conveyance path which passes through the applying means, the drying means, and the collecting means in succession.

This apparatus permits flakes of glass showing stable physical properties to be produced in large quantities continuously and industrially.

The flakes of glass referred to herein mean thin pieces of glass having vertical and horizontal dimensions less than 5 mm.

BEST MODE FOR CARRYING OUT THE INVENTION

Figure 1:
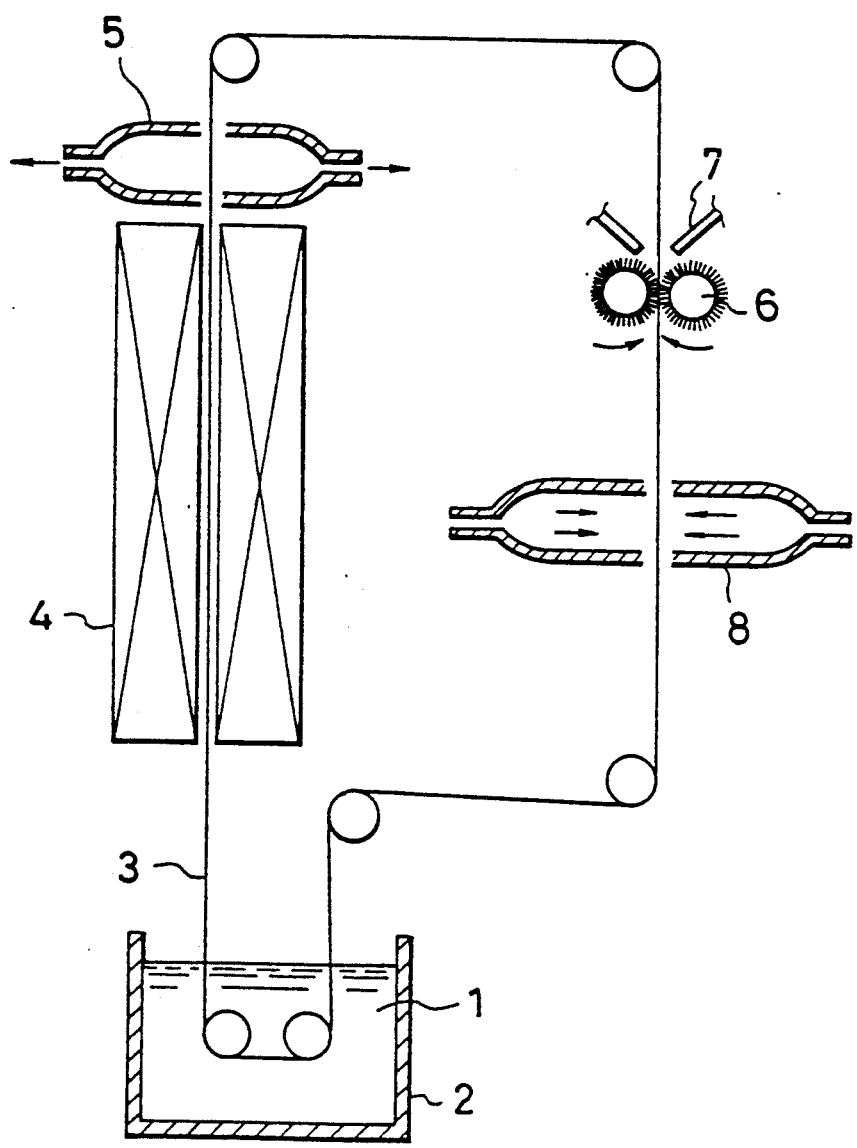
FIG. 1 is a cross-sectional view of an apparatus for producing flakes of glass according to the invention.

Essentially, any organic metal compound can be used in the present invention as long as it can be hydrolyzed and poly-condensed, but metal alkoxides having an alkoxyl group are preferable. More specifically, methoxides, ethoxides, propoxides, butoxides, and so on of silicon, titanium, aluminum, zirconium, and other elements are used alone or in combination.

Essentially, any solvent can be used as long as a solution containing an organic metal compound as described above is dissolved in the solvent, but the most preferred solvents are alcohols such as methanol, ethanol, propanol, and butanol. The ratio of the volume of the used solvent to the total volume of the organic metal compound and the solvent is 0.1 to 0.995, preferably 0.2 to 0.8, more preferably 0.3 to 0.75.

Water is needed for hydrolysis of the organic metal compound described above. This can be either acidic or basic, but in order to promote the hydrolysis, water acidified with hydrochloric acid, nitric acid, sulfuric acid, or other similar acid is preferably used. The mole ratio of the used acid to the organic metal compound is 0.01 to 2, preferably 0.1 to 1.5. If a basic water is employed, the solution may be gelled easily. In this case, the pot life of the solution is shortened.

In the case above mentioned, a solution obtained by reacting the organic metal compound with water of a molarity of one to 100 times as high as the molarity of the organic metal compound is preferably used. If this solution is applied to a substrate whose surface is smooth, and if the solution is subsequently dried, then the produced film on the substrate can be easily peeled from the substrate. Consequently, flakes of glass can be easily and efficiently mass-produced. No specific limitations are imposed to the temperature at which the organic metal compound is reacted with the water. As an example, temperatures ranging from 10° C. to 80° C. are desired. As the hydrolysis poly-condensation progress, metalloxane bonding is produced, and high polymers grow in the solution. As the molecular weights of the high polymers increase, adhesion to the substrate becomes weaker, and peeling is more likely to occur.

Flakes of glass which can be peeled off more easily can be easily produced by applying the liquid obtained by hydrolysis and poly-condensation of the organic metal compound to the substrate before the solution containing the organic metal compound is applied to the substrate as described above.

Preferably, the weight of the organic metal compound used per liter of the solution is 5 to 300 g., when converted into oxide. If the concentration of the solution is so low that the weight of the metal compound per liter of the solution is less than 5 g., then the film is too thin to well peel the film from the substrate. If the concentration is so high that the weight of the metal compound per liter of the solution is in excess of 300 g., then the solution is gelled. This makes it impossible to industrially produce flakes of glass continuously.

To vary the characteristics of the solution, the thickness of the solution applied to the substrate can be adjusted. For this purpose, an organic thickener or the like may be added to the solution. However, if the amount of this added thickener is excessive, then the material may be carbonized at the final stage, or heating step. Therefore, the amount of the added thickener should be limited within 10% by weight.

Where flakes of glass are produced, using the solution described above, addition of a raw material consisting of a transition metal oxide to the solution is effective in coloring the flakes of glass. Materials for coloring used in the present invention are compounds forming oxides which absorb light in the wavelength range from 400 nm to 800 nm, i.e., transition metal compounds. No restrictions are imposed to these materials as long as they are substantially dissolved in the solution. Preferable materials are alkoxides, acetates, acetylacetone salts, nitrates, and chlorides of transition metals. These materials are finally changed into oxides of transition metals within flakes of glass. The amount of the added transition metal oxide is determined by the intended coloring characteristics. Preferably, the amount of the transition metal oxide contained in the sintered flakes of glass is in excess of 0.1% and less than 70%, by weight. If the amount of the added transition metal oxide is less than 0.1% by weight, then the flakes are not sufficiently colored. Conversely, if the amount of the added transition metal oxide exceeds 70 by weight, then the amount of the matrix of glass is small and so the durability of the flakes of glass is extremely low with undesirable result. Where the colored flakes of glass are employed as filler for plastics, weatherproof coloration is imparted to them.

Where flakes of glass are produced, using the above-described solution, addition of a raw material consisting of an oxide of iron, cerium, titanium, vanadium, chromium, uranium, lead, or zinc is effective in imparting the capability to absorb ultraviolet radiation to the flakes of glass. No specific limitations are placed on the material, as long as it is a compound of any of the above-described metals and substantially dissolved in the solution. Preferred materials include alkoxides, acetates, acetylacetone salts, nitrates, and chlorides. The amount of the added metal oxide is determined by the intended ultraviolet-absorbing characteristics. Preferably, the amount of the metal oxide contained in the sintered flakes of glass is in excess of 0.1 and less than 70%, by weight. If the amount of the added metal oxide is less than 0.1 by weight, then the flakes are not capable of absorbing ultraviolet radiation sufficiently. Conversely, if the amount of the added metal oxide is in excess of 70 by weight, then the amount of the matrix of glass is small. In this case, the durability of the flakes of glass is extremely low, producing undesirable result.

Where flakes of glass absorbing ultraviolet radiation are used as filler for plastics, the plastics are prevented from being degraded by ultraviolet radiation. Also, they can be used for cosmetics blocking ultraviolet light.

Where flakes of glass are produced, using the above-described solution, addition of a raw material consisting of an oxide showing electrical conduction is effective in imparting electrical conduction to the flakes of glass. In this case, the electrical conduction is imparted either by using ions of silver oxide, sodium oxide, and lithium oxide or by electrons of vanadium oxide, iron oxides, indium oxide, and antimony oxide. No specific limitations are imposed to the raw materials used in the present invention, as long as they are compounds of the above-described metals and are substantially dissolved in the solution described above. Specific examples of the raw materials include alkoxides, acetates, acetylacetone salts, nitrates, and chlorides of the metals described above. The amount of the added metal oxide is determined by the intended electrical conductivity. Preferably, the amount of the metal oxide contained in the sintered flakes of glass is in excess of 0.1% and less than 70%, by weight. If the amount of the added metal oxide is less than 0.1 by weight, then a sufficient electrical conductivity does not appear. Conversely, if the amount of the added metal oxide exceeds 70% by weight, then the amount of the glass matrix is small, and the durability of the flakes of glass is extremely low with undesirable result. Where flakes of glass showing electrical conduction are used as filler for plastics, the capability to block or reflect electromagnetic waves can be imparted to the plastics.

The substrate used in the present invention can be made of metals, glasses, plastics whose surfaces are smooth. A liquid containing the above-described organic metal compound is reacted with water, if necessary. Then, the liquid is applied to the surface of a substrate made of any of these materials. Thus, a thin film having a thickness of 0.1 to 50 $\mu$m is created. The thickness of this film can be adjusted by controlling the viscosity of the solution. When this film dries, it shrinks, but the substrate will not shrink. Therefore, cracks are produced in the film, giving rise to flakes. In order that the film peels off the substrate, it is desired that the film be not bonded to the substrate. This requirement is fulfilled by making the substrate from a stainless steel.

Other materials which can be preferably used to form the substrate are precious metals such as gold and silver and materials coated with such a precious metal.

In order to accelerate peeling of the dried film off the substrate, the film can be scraped off with a rotating brush or sucked by a suction pipe.

The film can be peeled from the substrate and flakes of the film can be dispersed in water by fabricating the substrate from a plastic such as polyimide and immersing in water the substrate to which the dried film adheres.

The film can be formed on the substrate by a known technique. For example, in one method, the substrate is immersed in a solution containing an organic metal compound as described above and then the substrate is pulled up. In another method, the solution is dripped onto the substrate while the substrate is being spun at a high speed.

The thickness of the flakes of glass produced in accordance with the present invention is 0.05 to 5μm. If the thickness is greater than 5 μm, the difference in drying rate between free space and the vicinities of the substrate becomes too great. As a result, horizontal peeling occurs between the films in the substrate. If this peeling takes place, the film thickness of the obtained flakes of glass is distributed over a wide range, thus deteriorating the quality of the commercial product. Where the solution containing the organic metal compound is allowed to react with water and then applied to the substrate, flakes of glass can be produced up to a thickness of 10 μm. Conversely, if the thickness is less than 0.05μm, then the film adheres to the substrate too strongly, making it impossible to peel the film from the substrate. In consequence, flakes of glass cannot be obtained. Usually, the flakes of glass produced in accordance with the invention lie between 10 μm and several millimeters in diameter.

No specific restrictions are imposed on the method of sintering. Preferably, the sintering temperature and the sintering time are so selected that the transition from gel into glass is assured. Normally, the material is heated at 300°–1200° C. for 10 minutes to 2 hours. If the heating temperature and the heating time are increased, crystallization is more likely to occur. There arise no problems if the material is totally or partially crystallized. The word "glass" referred to herein is not limited to amorphous matter but includes crystalline matter.

The manner in which flakes of glass are produced, using the above-described various means of the manufacturing apparatus according to the invention is next described.

Essentially, any means can be used to apply the solution to the substrate, as long as the application of the solution containing the organic metal compound to the substrate produces a thin film. It is desired to adopt the dipping process, i.e., the substrate is immersed in the solution and pulled up at a constant rate.

The step of drying the film and the substrate after the application of the solution is carried out chiefly to evaporate the solvent. In this step, the film adhering to the substrate shrinks and peels off. It is desired to heat the film to promote the evaporation. The heating temperature roughly lies within a range from 40° C. to 500° C. It suffices to heat the film for about 1 to 30 minutes. If the heating temperature and the heating time are increased further, no essential improvements are achieved; rather the thermal energy is wasted.

The step of collecting the dried flakes is carried out to gather the dried flakes on the substrate. No specific limitations are placed on this method. Since the flakes are thin, a collection method making use of a gas is conveniently used.

In the novel apparatus, various steps can be added without trouble to the steps using the above-described three means, i.e., the applying means, the drying means, and the collecting means. For example, the step of washing and drying the substrate is effected to completely remove the remaining flakes and other contamination just when the collection of the flakes is completed. Under this condition, the solution can be again applied to this substrate. This is desirable from the viewpoint of quality control. An ordinarily used washing method may be used, depending on the kind of the substrate. It is easy to; wash the substrate mechanically with a brush and a cleaner. Also, this washing method is effective.

The organic metal compound, the solvent, the moisture used for the hydrolysis, and other factors used for the novel manufacturing apparatus have been already described. It is essential that the substrate used for the inventive manufacturing apparatus be capable of being shaped into a loop. Preferable materials which can be shaped into thin sheets and have sufficient strengths include metals such as stainless steel, aluminum, and plastics such as vinyl chloride and polyester. In any case, the surface must be smooth. Flakes of glass having highly uniform thicknesses can be produced by feeding belts carrying the substrate at a constant speed.

The thickness of the flakes of glass produced by the inventive manufacturing apparatus is affected by the concentration of the solution, the concentration of the raw material at the time of formation of the film, the drying temperature, the speed at which the substrate is moved, and other conditions. Roughly, the thickness is between 0.05μm and 10μm. If the film thickness is greater than about 10μm, then the difference in drying rate between the free surface on the film and the vicinities of the substrate becomes too great, thus producing horizontal peeling between the films in the substrate. Conversely, if the film thickness is smaller than about 0.05 μm, then the film adheres to the substrate too strongly. This makes it impossible to peel the film from the substrate. Hence, no flakes can be derived.

No specific limitations are placed on the method of sintering the peeled film as mentioned previously. It is required that the peeled film be heated at a sufficiently high temperate and for a sufficiently long time to ensure that the film makes a transition from gel to glass. Specific examples of the invention and comparative examples are given below.

EXAMPLE 1

Silicon tetraethoxide, ethanol, and water all of which were commercially available were mixed in a 1:2:1 volume ratio. The mixture was stirred at room temperature for about 3 hours. The obtained solution having a viscosity of about 1.1 centipoises (cp) was poured onto the horizontal surface of a sheet of stainless steel to form a thin film. The surface of the stainless steel sheet had been polished to make the surface smooth. The thickness of the sheet was 1 mm. The lamination was allowed to stand in the air and dried for about 2 hours. Then, the formed gel film was peeled from the stainless steel sheet. Subsequently, the obtained gel was divided into three parts. These three parts were sintered at 400° C., 600° C. 1000° C., respectively, for 1 hour. The flakes obtained in this way had particle sizes of about 5 mm. These flakes were examined by X-ray diffraction. It was found that none of these three parts showed sharp peaks and that they were in vitreous state. Observation of these parts with an electron microscope revealed that they were clean glass flakes having a film thickness of 0.8μm.

EXAMPLE 2

The same solution as the solution used in Example 1 was poured onto sheet glass placed horizontally and having a thickness of 3 mm to create a thin film. The film was then dried and sintered at a temperature of 400°–1000° C. for 1 hour. After the sintering, the flakes were examined by X-ray diffraction. It was found that no sharp peaks appeared and that the flakes were in vitreous state. Observation of the flakes with the electron microscope revealed that clean glass flakes having a film thickness of 0.8 μm resulted in the same way as in Example 1.

EXAMPLE 3

First, 100 ml of silicon tetramethoxide and 100 ml of ethanol which were commercially available were mixed. Then, 1 g. of acetylacetone salt of iron was dissolved in the mixture. The resultant mixture was stirred at room temperature for about 3 hours. Then, 20 ml of hydrochloric acid of 0.1 normal was gradually dripped into the mixture. The resulting solution showed a color of pale green. This solution was poured onto a sheet of stainless steel to create a thin film. The surface of the stainless steel sheet had been polished to make the surface smooth. The thickness of this sheet was 1 mm. The laminate was allowed to stand in the air and dried. The produced gel film was peeled off and sintered at temperatures between 400° C. and 1000° C. for 1 hour. After the sintering, the flakes were investigated by X-ray diffraction. It was found that none of the flakes showed sharp peaks and that they were in vitreous state. Chemical analysis revealed that the glass contained about 2.5% by weight of oxides of iron.

These flakes were observed with the electron microscope. It was found that they were clean glass flakes having a film thickness of about 0.8 μm. The flakes of glass gave a color of dark brown.

EXAMPLE 4

First, 100 ml of silicon tetramethoxide and 100 ml of ethanol which were commercially available were mixed. Then, 109 g. of cobalt nitrate was dissolved in the mixture. The resultant mixture was stirred at room temperature for about 3 hours. Thereafter, 20 ml of hydrochloric acid of 0.1 normal was gradually dripped into the mixture. The resultant solution showed a color of a very pale blue. This solution was poured onto a stainless steel sheet and dried under the same conditions as in Example 1. The obtained flakes were sintered at temperatures between 400° C. and 1000° C. for 1 hour. After the sintering, the flakes were investigated by X-ray diffraction. It was found that none of the flakes showed sharp peaks and that they were in vitreous state. Chemical analysis revealed that the glass contained about 68% by weight of cobalt oxide.

These flakes were observed with the electron microscope. It was found that they were clean glass flakes having a film thickness of about 0.8 μm. These flakes of glass exhibited a color of a very deep blue.

EXAMPLE 5

This example was similar to Example 3 except that 1.0 ml of titanium tetraisopropoxide was used instead of 1 g. of acetylacetone salt of iron. The solution into which hydrochloric acid was dripped exhibited a color of a pale yellow. After the sintering, the resultant flakes were analyzed chemically. It was found that the glass contained about 6% by weight of titanium oxide.

The glass flakes were observed with the electron microscope. They were very clean glass flakes having a film thickness of about 0.8 μm. Measurement of the transmittance characteristics showed that an absorption end existed at 280 nm and that rapid absorption was exhibited at the ultraviolet wavelengths.

EXAMPLE 6

This example was similar to Example 3 except that 20 g. of hydrated zinc nitrate ($Zn(NO_3)_2 \cdot 6H_2O$) was used instead of 1 g. of acetylacetone salt of iron. The solution into which hydrochloric acid was dripped was almost colorless and transparent. After the sintering of the gel film, it was analyzed chemically. The glass contained about 11% by weight of zinc oxide.

The glass flakes were observed with the electron microscope. It was found that they were clean glass flakes having a film thickness of about 0.8 μm. Measurement of the transmittance characteristics showed that an absorption end existed at 300 nm and that rapid absorption was exhibited at the ultraviolet wavelengths.

EXAMPLE 7

This example was similar to Example 3 except that 6.5 ml of triisopropoxy vanadyl was used instead of 1 g. of acetylacetone salt of iron. After sintering the gel film, it was chemically analyzed. The glass contained about 9.5% by weight of vanadium oxides.

The glass was observed with the electron microscope. It was found that clean flakes of glass having a film thickness of about 0.8 μm were produced. These glass flakes were mixed with a commercially available epoxy resin in a 1:10 weight ratio. The resultant mixture was stretched up to a thickness of about 2 mm on a glass plate and solidified. The resultant film was peeled off, and an electrical resistance between two locations which were spaced apart 10 cm was measured. The resistance was about 100 ohms. Since the epoxy resin alone did not show electrical conduction, it was confirmed that the flakes of glass had a high electrical conductivity.

EXAMPLE 8

This example was similar to Example 3 except that 10 g. of metal sodium was employed instead of 1 g. of acetylacetone salt of iron. After the sintering of the gel film, it was analyzed chemically. The glass contained about 32% by weight of sodium oxide. It was observed with the electron microscope. Clean flakes of glass having a film thickness of about 0.8 μm were observed. The flakes of glass were mixed with an epoxy resin to fabricate a composite film, and an electrical resistance between the two points spaced apart 10 cm was measured, in the same way as in Example 7. The resistance was about 500 ohms. It was proved that the flakes of glass had a high electrical conductivity.

EXAMPLE 9

Silicon tetraethoxide, ethanol, and hydrochloric acid water of 0.1 normal all of which were commercially available were mixed in a 1:2:1 volume ratio. At this time, the added water was about 8 times as much as the silicon tetraethoxide in terms of molar ratio. The concentration of silica was about 100 g. per liter of the solution. The mixture was stirred at 40° C. for about 20 hours. The resultant solution was poured onto a stainless steel sheet of 1 mm thickness to create a thin film. The surface of the stainless steel sheet had been polished to smoothen the surface. The film was allowed to stand in the air and dried. The film peeled from the substrate over the whole area of the applied solution, producing flakes. The flakes were sintered at temperatures between 400° C. and 1000° C. for 1 hour. After the sintering, the flakes were examined by X-ray diffraction.

None of the flakes showed sharp peaks. They were in vitreous state. They were observed with the electron microscope. We noticed clean flakes of glass having a film thickness of 0.8 μm.

EXAMPLE 10

Silicon tetraethoxide, ethanol, and hydrochloric acid water of 0.1 normal all of which were commercially available were mixed in a 4:0.5:1 volume ratio. The added water was about 2 times as much as the silicon tetraethoxide in terms of molar ratio. The concentration of silica was about 290 g. per liter of the solution. The reaction was carried out under the same conditions as in Example 9. The resultant solution was poured onto a glass sheet having a thickness of 3 mm and dried. At this time, the film peeled off the substrate over the whole area of the applied solution, thus giving rise to flakes. The flakes were sintered at temperatures between 400° C. and 1000° C. for 1 hour. After the sintering, the flakes were investigated by X-ray diffraction. None of the flakes showed sharp peaks. They were in vitreous state. Observation with the electron microscope revealed that they were clean flakes of glass having a film thickness of 1.5μm.

EXAMPLE 11

Silicon tetraethoxide and pure water which were commercially available were mixed in a 1:12 volume ratio. At this time, the added water was about 98 times as much as the silicon tetraethoxide in terms of molar ratio. The concentration of silica was about 30 g. per liter of the solution. The reaction was carried out under the same conditions as in Example 9. The solution was poured onto a glass sheet having a thickness of 3 mm and dried. At this time, the film peeled off the substrate over the whole area of the applied solution, resulting in flakes.

The flakes were sintered at temperatures between 400° C. and 1000° C. for 1 hour. After the sintering, the flakes were investigated by X-ray diffraction. None of the flakes showed sharp peaks. They were in vitreous state. Observation with the electron microscope revealed that they were clean flakes of glass having a film thickness of 0.5μm.

COMPARATIVE EXAMPLE 1

The water of the solution in Example 9 described above was replaced with ethanol. A solution was prepared by mixing 1 part by volume of silicon tetraethoxide with 3 parts by volume of ethanol both of which were commercially available. This solution was not hydrolyzed nor polymerized. This solution was applied to a stainless steel substrate and dried under the same conditions as in Example 9. Then, peeling was attempted. During the drying, about 90 of the total area of the film disappeared due to evaporation. The remaining 10% of the film adhered strongly to the substrate, and it was difficult to peel off the remaining film.

EXAMPLE 12

An apparatus for producing flakes of glass is shown in FIG. 1. Solution 1 was prepared by mixing 1000 ml of silicon tetramethoxide and 1000 ml of ethanol, and 1200ml of hydrochloric acid of 0.1 normal all of which were commercially available. This solution 1 was contained in a bath tub 2. A substrate 3 to which solution 1 was to be applied was a stainless steel belt having a width of 30 cm and a thickness of 50 μm. This belt was fed at a constant speed of 50 cm/min. to produce flakes continuously. A film was created on the substrate just at the instant that the substrate 3 was pulled into the air out of solution 1. Drying was effected by passing the substrate 3 through an electric furnace 4 that was retained at 80° C. At this time, flakes of glass were peeled from the substrate 3. At the same time, the flakes were collected by a device 5 that sucked them over the substrate 3. The collected flakes were heated at 800° C. by an electric furnace (not shown) to produce flakes of glass. The substrate 3 was washed and dried by a brush 6 rotating in a direction opposite to the direction of movement of the substrate. A device 7 for spraying pure water was mounted to enhance the effect of the washing. The drying was performed with a hot air drier 8. After going through these steps, the substrate 3 was placed in the original position. This apparatus could produce flakes of glass continuously.

It is to be noted that FIG. 1 shows only one example of the inventive manufacturing apparatus and that the invention is not limited to this example.

Industrial Applicability

In accordance with the inventive method, very thin flakes of glass, very thin colored flakes of glass, very thin flakes of glass absorbing ultraviolet radiation, and very thin flakes of glass showing electrical conduction which have been heretofore difficult to produce can be easily and efficiently produced.

Also, in the inventive apparatus, flakes of glass which have been heretofore difficult to produce can be continuously, easily, and efficiently produced.

I claim:

1. A process for producing amorphous or crystalline flakes absorbing ultraviolet radiation, comprising,
    preparing an organic silicon compound, an alcohol for solving the organic silicon compound, a compound effective in imparting capability to absorb ultraviolet radiation, said compound being soluble to the alcohol in which the organic silicon compound is solved and containing a material selected from the group consisting of iron, cerium, titanium, vanadium, chromium, uranium, lead and zinc, and water for hydrolysis of the organic silicon compound,
    mixing the organic silicon compound, alcohol, compound for absorption of ultraviolet radiation and water together so that hydrolysis of the organic silicon compound occurs and polymers containing said material for absorption of ultraviolet radiation grow to thereby form a solution,
    applying the solution onto a substrate,
    drying the solution on the substrate to form a film containing the material for absorption of ultraviolet radiation and silicon, said film, while drying, shrinking and cracking on the substrate to thereby form flakes, and
    heat-treating the flakes to form the amorphous or crystalline flakes, 0.1-70 wt % of an oxide with said material for absorption of ultraviolet radiation being included in the flakes.

2. The process of claim 1, wherein the amount of the organic silicon compound contained in the solution is 5 to 300 grams per liter of the solution when calculated as silicon oxide.

3. The process of claim 1, wherein the organic metal compound is silicon alkoxide having an alkoxyl group.

4. The process of claim 1, wherein the ratio of the volume of the solvent to the total volume of the organic silicon compound and the solvent is 0.1 to 0.995.

5. The process of claim 1, wherein said water is an acidic water.

6. The process of claim 5, wherein the mole ratio of the acid water to the organic silicon compound is 0.01 to 2.

7. The process of claim 1, wherein the hydrolysis occurs at a temperature of 10°–80° C.

8. The process of claim 1, wherein the solution containing the organic silicon compound is applied to the substrate for a thickness of 0.1 to 50 μm.

9. The process of claim 1, wherein said substrate is made of stainless steel.

10. The process of claim 1, wherein the heat-treating is performed at 300°–1200° C. for 10 minutes to 2 hours.

11. The process according to claim 1, wherein in said mixing, 1 mole of the organic silicon compound is mixed with 1–100 moles of water to react the organic silicon compound with water, said solution containing metalloxane bonding formed by hydrolysis of the organic silicon compound, said amorphous or crystalline flake having a thickness between 0.05 and 10 micrometer and a diameter between 10 micrometer and several millimeters.

12. The process according to claim 1, wherein said substrate is in a form of a loop and is rotated endlessly to continuously form the flakes.

13. The process according to claim 12, further comprising collecting the flakes from the substrate for the sintering, and washing and drying the substrate so that the flakes are continuously formed while the substrate is endlessly moving.

14. The process according to claim 1, wherein said flakes are added to cosmetics for blocking ultraviolet light.

15. A process for producing amorphous or crystalline flakes absorbing ultraviolet radiation, comprising,
   mixing an organic metal compound, an alcohol for solving the organic metal compound, and a compound effective in imparting capability to absorb ultraviolet radiation, said compound for absorption of ultraviolet radiation being soluble to the alcohol in which the organic metal compound is solved and containing a material selected from the group consisting of iron, cerium, titanium, vanadium, chromium, uranium, lead and zinc,
   adding water to the above mixture containing the organic metal compound, alcohol and compound for absorption of ultraviolet radiation so that hydrolysis of the organic metal compound occurs and polymers containing said material for absorption of ultraviolet radiation grow in a solution,
   applying the solution onto a substrate,
   drying the solution on the substrate to form a film containing the metal compound and the material for absorption of ultraviolet radiation, said film, while drying, shrinking and cracking on the substrate to thereby form flakes, and
   heat-treating the flakes to form the amorphous or crystalline flakes.

16. The process according to claim 15, wherein 0.1–70 wt % of an oxide with said material for absorption of ultraviolet radiation is included in the flakes, 1 mole of the organic metal compound being mixed with 1–100 moles of water in said mixing, said solution containing metalloxane bonding formed by hydrolysis of the organic metal compound, said amorphous or crystalline flake having a thickness between 0.05 and 10 micrometer and a diameter between 10 micrometer and several millimeters.

* * * * *